United States Patent Office 3,483,161
Patented Dec. 9, 1969

3,483,161
PROCESS FOR THE PRODUCTION OF SILICON-CONTAINING TRIOXANE MIXED POLYMERS
Wolfgang von der Emden, Leverkusen, Walter Simmler, Cologne-Mulheim, and Kuno Wagner, Leverkusen, Germany, assignors to Farbenfabriken Bayer Aktiengesellschaft, Leverkusen, Germany, a corporation of Germany
No Drawing. Filed Dec. 21, 1967, Ser. No. 692,299
Claims priority, application Germany, Jan. 12, 1967, F 51,233
Int. Cl. C08g 31/02
U.S. Cl. 260—46.5       5 Claims

ABSTRACT OF THE DISCLOSURE

Copolymerisation of a silicic acid ester and trioxane at a temperature of 50 to 100° C. in the presence of a cationic initiator to obtain a silicon-containing trioxane-copolymer of improved thermal and oxidation stability.

---

It is known that trioxane, the cyclic trimer of formaldehyde, can be transformed by various processes into linear high molecular weight polyoxymethylenes. The high polymers of trioxane are easily and quantitatively degraded into monomeric formaldehyde on heating or by catalytic quantities of acids or caustic solutions.

The stability of polyoxymethylenes can be improved by etherifying or esterifying the terminal groups. Difficulties are met in the complete reaction of the terminal groups, however, because no solvent is known which dissolves polyoxymethylene at low temperature whilst at higher temperature, and more especially during the etherification, a thermal or acid-catalysed degradation is initiated.

Polyoxymethylenes with stabilising terminal groups are more easily obtained by copolymerisation of trioxane with cyclic compounds, which results in chains consisting not only of formaldehyde units, but containing linear radicals formed by ring opening of the cyclic compound between the formaldehyde units. If the incorporation of the comonomer is effected at random and only a few percent thereof are incorporated, the majority of the ends of the chains are of hemi-acetal nature.

Under the influence of alkali or on heating, formaldehyde is split off from such copolymers, but the degradation comes to a stop when a radical of the comonomer has become the terminal group.

Epoxides, and cyclic formals of aliphatic diols, such as 1,3-dioxolane, tetramthylene diol form, diethylene glycol formal and triethylene glycol formal are examples of known cyclic comonomers.

The mixed polymers, since they contain acetal and e.g. ether linkages, are just as susceptible to oxidation as those homopolymers of trioxane or formaldehyde which are closed at the terminal groups, and also their thermostability is of the same order as that of these latter compounds and is characterized by a thermal degradation of approximately 1% by weight per hour at 220° C.

To improve their thermal and oxidation stability, the polymers can be combined with additives, which can be, for example, phenols, carbonamides, ureas or carbodi-imides. The sensitivity to oxidation is also reduced by using comonomers which contain sulphur, such as 1,3-oxthiolane or 1,3-dioxa-6-thia-cyclooctane (thiodiglycol formal). With trioxane-oxthiolane mixed polymers, it is possible largely to dispense with oxidation stabilisers, but the thermal stability is not better than that of the homopolymers and trioxane-ethylene oxide copolymers.

A process for the production of new trioxane mixed polymers has now been found, which comprises copolymerising a silicic acid ester of a sila-alcohol, in the form of a cyclic derivative or organosilicon compounds containing these components as segments, with trioxane at a temperature from 50 to 120° C. in the presence of a cationic initiator.

An object of this invention are novel copolymers of trioxane and a process for producing them. Generally speaking novel trioxane copolymers are obtained by copolymerizing trioxane and a cyclic silicic acid ester at a temperature of from 50 to 120° C. in the presence of a cationic initiator.

The silicic acid esters of this invention correspond to the general formula

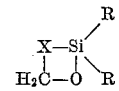

wherein R is lower alkyl (preferably $C_1$–$C_3$) and phenyl, X is lower alkylene (preferably $C_2$–$C_5$), —$SiR_2$—O— and —$SiR_2$—O—$CH_2$—.

Examples of these compounds are:
2,2,5,5-tetramethyl-2,5-disila-1,3-dioxolane, the preparation of which is described in Belgian patent specification No. 685,083; 2,2,5,5-tetramethyl-2,5-disila-1,4-dioxane, the preparation of which is described in Chem. Ber., 99, 1368 (1966); and also 2,2-diethyl-2-sila-tetrahydrofuran and 2,2-dimethyl-2-sila-tetrahydropyran, the preparation of which is described in Makromol. Chemie, 73, 85 (1964) and Z. anorg. allg. Chem., 345 53 (1966), and 2,2-diethyl-2-sila-1-oxacyclooctane.

The copolymerisation of trioxane with the silicic acid esters of sila-alcohols is started by cationic initiators. As initiators, it is possible to use strong acids such as sulphuric acid, perchloric acid, alkane-sulphonic acids and p-toluenesulphonic acid, as well as Lewis acids, such as ferric chloride, ferric bromide, antimony pentachloride, titanium tetrachloride and tin tetrachloride, and also oxonium salts, such as triethyl oxonium tetrachloroferrate. The initiators are conveniently added to the mixture in quantities of 0.001 to 1% by weight, calculated on the total of trioxane and silicon compound.

The copolymerisation can be carried out as block polymerization, which takes place within a short time and with an almost quantitative yield. In such a case, the catalyst is melted with the trioxane and simultaneously the comonomer is added, or, alternatively, the trioxane is first melted with the comonomer and then the catalyst is supplied, optionally in an inert solvent. The polymerisation can also be carried out in suspension, in an organic liquid in which trioxae has only limited solubility. Suitable liquids for such a procedure include for example, straight-chain aliphatic hydrocarbons with more than 8 carbon atoms or mixtures thereof, such as for example a $C_{12}$–$C_{18}$ fraction of the boiling range 230 to 320° C.

If the polymerisation is carried out in solution, the following solvents can, for example, be used: Hydrocarbons as benzene, toluene, hexane, heptane, cyclohexane, isooctane, white spirit, hydrogenated trimeric isobutylene and chlorinated hydrocarbons.

The polymerisation according to the invention is generally conducted at a temperature from 50 to 120° C., advantageously at 70 to 110° C. It is often possible to work with advantage at 70 to 85° C. It is also possible to go above or below the indicated temperature range in particular instances.

The copolymers are initially still unstable. The acid catalyst and a certain proportion of loosely bonded formaldehyde must be removed. For this purpose, the crude polymer must be treated by suspending it for some time in an aqueous or alcoholic solution of an inorganic or organic base. It is advantageous to use 5–10% by weight aqueous sodium hydroxide solution in a tenfold excess, based on the polymer, at 90–100° C. It is surprising that this procedure, which leads to stable products with mixed polymers of trioxane and, for example, ethylene oxide can also be used here. It was not to be expected that the grouping —$CH_2$—Si—O—Si or —$CH_2$—Si—O—$CH_2$— would be stable with respect to boiling aqueous sodium hydroxide solution after incorporation into the polyoxymethylene chain.

After the treatment with sodium hydroxide solution, the loosely bonded formaldehyde is generally completely degraded. Optionally the material is subsequently heated for a short time (up to 15 minutes) under vacuum at a temperature above its melting point (up to 160–220° C.). A material is then obtained which loses less than 1% of its weight per hour at 222° C. under nitrogen. A differential thermoanalysis test shows the commencement of the decomposition under nitrogen at 300° C. and the decomposition maximum at 320° C., i.e. 30° C. to 50° C. higher than for trioxane-ethylene oxide polymers.

Depending on the intended purpose of use the amount of the cyclic silicic acid ester to be copolymerized may be present in amounts varying over a wide range. Copolymers containing from about 0.1 to 10 mol percent based on the trioxane of the cyclic comonomer are suitable as thermoplastic materials, for instance for producing moulded articles by the injection moulding method or for producing fibres by the melt spinning method. The intrinsic viscosity of these products is generally in the range of 0.6 to 2.0, measured at 60° C. in an 0.5% by weight solution in p-chlorobenzene. With copolymer amounts of from about 10 to about 50 mol percent based on the trioxane modified and easily crystallizing polysiloxanes are produced. The molecular weight of these products may be as low as about 500. These products have an oily or resin-like appearance at room temperature. They may be used as lubricants and as moderators or modifiers, for instance as softeners for other plastics, e.g. polyoxymethylenes if a chemically completely resistant modifier is wanted. They may further be used to improve the distribution of an inorganic filler, as for instance silica in a silicon rubber. Especially valuable products of this type are obtained if hexamethylcyclotrisiloxane or other cyclic siloxanes are copolymerized. Their amount may be as high as 50 mol percent of the total monomer mixture. These products have the properties of polysiloxanes.

In the case of the thermoplastic moulding masses the usual additives, as light stabilizers, dyestuffs, pigments or plasticisers may be and very often are added to the polymers.

The polymers obtained in the process of the invention contain —$OCH_2$—$OCH_2$—$OCH_2$— structural elements which are derived from the trioxane and structural elements derived from the comonomer of the formula —O—$SiR_2$—X—$CH_2$— wherein the definitions are as above. The distribution in the comonomer is statistical. These structural elements arise from splitting of the cyclic monomer at the O—$CH_2$ bond. Linking this element to the trioxane structural element will be as follows:

—$OCH_2$—$OCH_2$—$OCH_2$—O—$SiR_2$— 
  X—$CH_2$—$OCH_2$—$OCH_2$—$OCH_2$

If the cyclic comonomer is split at the O—Si bond the structural element will be —$SiR_2$—X—$CH_2$—O— which is linked as follows

—$CH_2$O—$CH_2$O—$CH_2$O—$SiR_2$—X— 
  $CH_2$—O—$CH_2$O—$CH_2$O—$CH_2$O— to the trioxane element. This demonstrates that independently from the type of splitting the polymer obtained is identical. It is not presently known which type of splitting occurs but there is reason to believe that the first type of splitting is at least preferred.

Furthermore, by additional use of other comonomers, for example cationically polymerisable olefines or cyclic compounds, the properties of the copolymers can be still further modified. Examples of such additional comonomers, include styrene, acrylonitrile, ethyl vinyl ether, methyl vinyl sulphone, epoxy compounds such as ethylene oxide or propylene oxide, cyclic acetals such as 1,3-dioxolane, diethylene glycol formal and triethylene glycol formal, as well as organic nitrogenous comonomers such as bis-(alkylsulphonyl)imidazolidines and alkylsulphonyl oxazolidines, and organic silicon comonomers, such as hexamethyl cyclotrisiloxane, octamethyl cyclotetrasiloxane and 2,2,8,8-tetramethyl-2,8-disila-1,4,6-trioxacyclooctane.

EXAMPLE 1

0.8 ml. of a 1% by weight ferric bromide solution is added to a solution of 4 g. of freshly distilled 2,2,5,5-tetramethyl-2,5-disila-1,3-dioxolane in 40 g. of trioxane at 70° C. (The ferric bromide solution is prepared by dissolving 300 mg. of ferric bromide in 0.7 ml. of di-n-butyl ether and making up with benzene to 30 ml.) The reaction mixture becomes cloudy, then becomes viscous and finally solid. After 4 hours, the hard block is comminuted, suspended in 400 ml. of water with 10 g. of triethylamine and 4 g. of Rochelle salt and boiled under reflux for 10 hours. 30 g. of polymer are obtained, which loses 1% of its weight per hour at 220° C. and contains 1.18% by weight of Si.

EXAMPLE 2

A mixture of 500 g. of trioxane, 250 ml. of cyclohexane and 25 g. of freshly distilled 2,2,5,5-tetramethyl-2,5-disila-1,3-dioxolane is treated at 70° C. with a solution of 200 mg. of triethyloxonium tetrachloroferrate in 1 ml. of nitrobenzene and reaction is allowed to take place for 1 hour at 70° C. There are obtained 279 g. of polymer having an intrinsic viscosity $\eta 60°$ of 0.766, measured at 60° C. p-chlorophenol, and this polymer, after treatment with 5% by weight aqueous sodium hydroxide solution for 10 hours, loses 0.5% of its weight per hour in the thermostability measurement carried out at 220° C. Differential thermoanalysis shows the commencement of decomposition at 300° C.

What is claimed is:
1. A copolymer comprising statistically distributing structural units of the formula —$OCH_2$—$OCH_2$—$OCH_2$— and units of the formula —O—$SiR_2$—X—$CH_2$— wherein R is lower alkyl or phenyl and X is lower alkylene, —O—$SiR_2$— or —$CH_2$—O—$SiR_2$—, said copolymer containing 0.1 to 50 mol percent of said

—O—$SiR_2$—X—$CH_2$— structural units and having a molecular weight of at least 500.

2. The copolymer of claim 1 which is thermoplastic, has an intrinsic viscosity, measured at 60° C. in a 0.5% by weight solution in p-chlorobenzene, of from 0.6 to 2.0 and contains said —O—SiR$_2$—X—CH$_2$— structural units in an amout of 0.1 to 10 mol percent.

3. The copolymer of claim 1 which is oily or resinous and contains said —O—SiR$_2$—X—CH$_2$— structural units in an amount of from 10 to 50 mol percent.

4. The copolymer of claim 1 wherein R is lower alkyl containing a total of up to 3 carbon atoms.

5. The copolymer of claim 1 wherein X is alkylene and contains from 2 up to 5 carbon atoms.

References Cited

UNITED STATES PATENTS

| | | | |
|---|---|---|---|
| 3,200,096 | 8/1965 | Hudgin et al. | 260—67 |
| 3,347,969 | 10/1967 | Moelter | 264—210 |
| 3,357,953 | 12/1967 | Baumber | 260—67 |
| 3,369,039 | 2/1968 | Von der Emden et al. | 260—46.5 |

DONALD E. CZAJA, Primary Examiner

M. I. MARQUIS, Assistant Examiner

U.S. Cl. X.R.

260—37, 67, 448.2, 824